Jan. 7, 1969  R. D. CRENSHAW ET AL  3,420,090

RETENTION FORCE GAGE

Filed June 29, 1967

*INVENTORS.*
RICHARD D. CRENSHAW
RONALD S. SADDORIS
BY
*George L. Sullivan*
Agent

United States Patent Office 3,420,090
Patented Jan. 7, 1969

3,420,090
RETENTION FORCE GAGE
Richard D. Crenshaw, Palo Alto, and Ronald S. Saddoris, San Jose, Calif., assignors to Lockheed Aircraft Corporation, Burbank, Calif.
Filed June 29, 1967, Ser. No. 649,937
U.S. Cl. 73—9  1 Claim
Int. Cl. G01n *19/02*

ABSTRACT OF THE DISCLOSURE

A gage for determining if a female electrical socket has sufficient grip force includes a pin which is inserted into the socket. If the socket lacks sufficient grip force, a spring associated with the pin pulls the pin out of the socket.

FIELD OF THE INVENTION

This invention is directed to a gage and more particularly to a gage utilized to determine if a female electrical contact grips with sufficient force.

DESCRIPTION OF THE PRIOR ART

A major cause of failures in electrical devices is insufficient or intermittent connection across the connector. Many attempts have been made to solve this problem with various degrees of success being obtained. A variety of connectors have been designed and various modes of testing have been utilized to minimize this problem. However, due to the sophistication of electronic devices where the failure of one connection can demobilize a total system and the inherent multiplication of interconnections, connector failure is still a major problem area.

One type of connector contact consists of a resilient cylindrical-shaped female socket that is adapted to grip a male contact along its cylindrical periphery. This contact is quite satisfactory provided it grips the male contact with sufficient force to make a good electrical connection. However, if the force is not sufficient, the circuit may be intermittent or even open as a result of vibration or incomplete mechanical continuity. To determine if the gripping force is sufficient, each socket of the female connector should be checked with a gage prior to the mating with the male connector. To make this test in the prior art, it was necessary to remove the female connector from its attaching means, and orient the connector so that the female sockets are vertically oriented with openings at the top. A pin attached to a weight equivalent to the minimum desired retention force was then inserted in the female contact. The assembly was then inverted. If the weight did not pull the pin from the female connector, the grip force of the female connector was sufficient. If the weight pulled the pin out of the female connector, the gripping force was below the minimum allowed and the female contact had to be replaced or repaired. A major difficulty in the prior art testing operation was the problem encountered in inverting or moving the female connector sockets. Oftentimes they were permanently affixed to an aircraft, spacecraft, or the like, and it was impossible to test the connector except in those cases where the complete vehicle could be moved or inverted.

SUMMARY OF THE INVENTION

The present invention is much simpler in operation than the prior art. The connector to be tested can be oriented in any direction and thus it is not necessary to remove the connector from its mounting means for testing the contacts nor change the orientation of the connector during the test. The face of the gage is brought into proximity with the contact to be tested, pressure is applied to the cylinder forcing the pin into the contact socket. Since the gage is self aligning, it is only necessary to apply pressure on the cylinder in a direction substantially parallel with the contact until the gage is seated up to the shoulder. The gage is then released. In practice the gage will then do one of two things, either stay seated in the contact if the contact grip force is equal to or greater than the allowable minimum, or the spring will force the pin out of the contact giving the whole gage a spring action causing the gage to jump away from the connector face.

BRIEF DESCRIPTION OF THE DRAWINGS

Other objects of this invention will become apparent to those skilled in the art by reference to the following detailed description of the exemplary embodiment of the apparatus and the appended claim. The various features of the invention may be best understood with reference to the accompanying drawing, wherein:

DESCRIPTION OF THE PREFERRED EMBODIMENT

Figure 1:
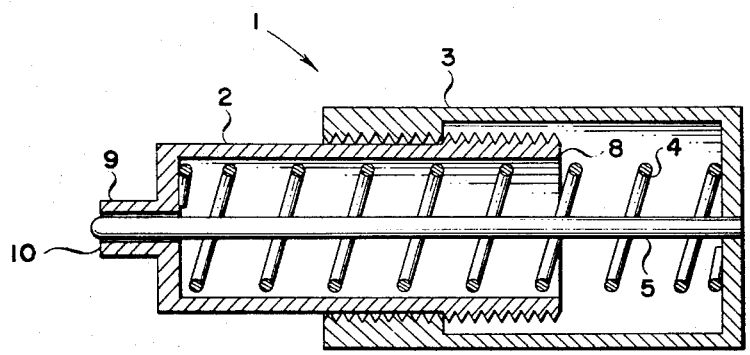
FIGURE 1 is a partial section of the apparatus having portions of its cylinder fragmentally shown and the piston extended to its normal maximum extended position.
Figure 2:
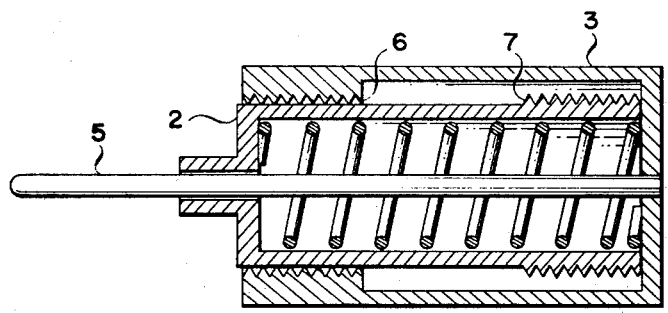
FIGURE 2 is a partial section of the apparatus in which the piston is drawn into the cylinder to its maximum retracted position.
Figure 3:
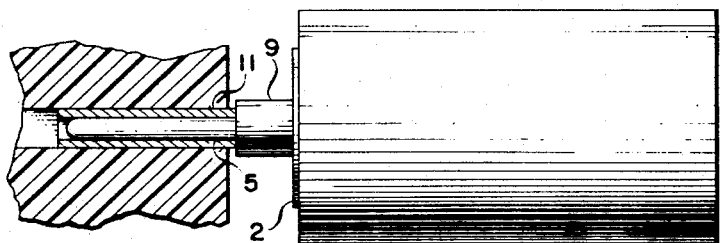
FIGURE 3 shows the apparatus inserted into a contact socket of an electrical connector, the connector being fragmentally shown.

Referring to FIGURES 1 to 3, a testing apparatus 1 is shown as including a piston 2 which is slidably mounted in cylinder 3. One end of cylinder 3 is provided internal threads 6 along a portion of its length to accommodate similar threads 7 on the outside of piston 2. The remainder of the interior or the cylinder 3 is non-threaded and undercut for reasons that will be hereafter explained. The other end of cylinder 3 is closed except for a bore or aperture into which a pin 5 is rigidly fixed as by welding, a set screw, or the like. Piston 2 is provided at one end with a hollow bore and on the other end with a sleeve 9 that terminates in a flat shoulder 10. Piston 2 has interrelating threads (7) along its outer surface adjacent the hollow bore which are meshable with the threads (6) of cylinder 3. Pin 5 extends through the aperture in piston 2 and is coaxial with sleeve 9. The length of pin 5 is chosen so that when the piston 2 is retracted to its maximum position (FIGURE 2) the portion of the pin 5 extending beyond shoulder 10 of piston 2 is substantially equal to the length of the desired male electrical connector pin (not shown). Calibrated spring 4, which is substantially coaxial with pin 5, is held captive between piston 2 and cylinder 3. Spring 4 is calibrated such that when it is compressed as shown in FIGURE 2, which occurs when the connector tester is fully inserted within the contact, it exerts a force on cylinder 3 that is substantially equivalent to the minimum allowable retention force of contact 11.

As shown in FIGURE 1 in the quiescent condition, piston 2 will be held in its outermost position by spring 4. In this position threads 6 and 7 are not threaded together and act merely as a stop. Due to the above-mentioned undercut portion of cylinder 3, piston 2 is free to have some eccentric movement relative to cylinder 3, thus giving the apparatus a self-aligning feature.

The over-all length of the apparatus 1 is such that a person can readily grip cylinder 3 but is small enough that no appreciable torque can be applied between the apparatus and the connector which would tend to bend pin 5 and/or deform contact 11.

OPERATION

The connector tester (1) is brought into proximity with the contact 11 to be tested. The tip of pin 5, which extends slightly beyond shoulder 10 of piston 2, is inserted in the contact 11. Cylinder 3 is pushed in a direction substantially normal to the connector face until shoulder 10 seats on the contact. Cylinder 3 is then released. If the connector tester remains in that position, the grip of contact 11 on pin 5 is equal to or greater than the allowable minimum grip force. If, on the other hand, the grip force is less than allowed minimum, spring 4 will move the cylinder 3 relative to piston 2 thus pulling pin 5 out of contact 11. In actual practice this happens so fast that the whole apparatus 1 springs out of contact with the connector.

Obviously many modifications and variations of the invention as hereinabove set forth may be made without departing from the spirit and scope thereof, and therefore only such limitations should be imposed as are indicated in the appended claim.

We claim:
1. A device for measuring the grip force exerted by a female electrical contact comprising
   a cylinder and a hollow piston,
   said cylinder is provided with internal threads along a portion of its length and the remainder of the interior of the cylinder is undercut,
   said hollow piston being mounted for limited slideable movement within said cylinder,
   said hollow piston provided with external threads which are engageable with said internal threads of said cylinder,
   a sleeve coaxially attached to one end of said piston and extending outwardly from the open end of said cylinder,
   a pin coaxially affixed to the closed inner end of said cylinder and extending through said sleeve,
   and biasing means,
   said biasing means being held captive within said cylinder and the hollow bore in said piston,
   said biasing means further defined as a spring,
   whereby said hollow piston is biased to normally extend substantially beyond the open end of said cylinder.

References Cited

UNITED STATES PATENTS

| | | | |
|---|---|---|---|
| 2,593,269 | 4/1952 | Clifford et al. | |
| 2,656,716 | 10/1953 | Hoggatt | 73—81 |
| 2,821,080 | 1/1958 | Gemignani | 73—141 XR |
| 2,960,864 | 11/1960 | Watts | 73—141 |
| 3,078,710 | 2/1963 | Palmer | 73—81 |
| 3,153,956 | 10/1964 | Zdrakas | 73—141 XR |
| 3,292,430 | 12/1966 | Collier et al. | 73—141 |

LOUIS R. PRINCE, *Primary Examiner.*

J. NOLTON, *Assistant Examiner.*

U.S. Cl. X.R.

73—141; 81—3